Oct. 21, 1952 R. M. HEINTZ 2,614,670
SPRAG TYPE OVERRUNNING CLUTCH
Filed Aug. 14, 1946 2 SHEETS—SHEET 1

INVENTOR.
RALPH M. HEINTZ
BY
ATTORNEY

Oct. 21, 1952 R. M. HEINTZ 2,614,670
SPRAG TYPE OVERRUNNING CLUTCH
Filed Aug. 14, 1946 2 SHEETS—SHEET 2

INVENTOR.
RALPH M. HEINTZ
BY
ATTORNEY

Patented Oct. 21, 1952

2,614,670

UNITED STATES PATENT OFFICE 2,614,670

SPRAG TYPE OVERRUNNING CLUTCH

Ralph M. Heintz, Cleveland, Ohio, assignor to Jack & Heintz Precision Industries, Inc., Cleveland, Ohio, a corporation of Delaware Application August 14, 1946, Serial No. 690,399

1 Claim. (Cl. 192—45.1)

This invention relates in general to overrunning, or one-way, clutches and more particularly to such clutches that employ tiltable grippers, or sprags.

Such clutches are frequently used in certain types of rotary transmissions where power impulses from the driver occur in rapid succession with an interval between the succeeding impulses during which the driver must be disconnected from the driven member. It is, therefore, essential that the clutch be instantaneously connected as its action may be for a very small time interval. Another condition affecting the operation of the clutch is that it may be subjected to centrifugal force eccentric to its axis of revolution in which case the inertia of the clutching elements may interfere with instantaneous engagement.

It is, therefore, an object of the present invention to provide a rotary overrunning clutch capable of instantaneous engagement and disengagement and which will be unaffected by other forces, such as eccentric centrifugal force.

Another object of the invention is to provide an overrunning clutch in which the sprags and spacers comprise a self-contained unit which may be handled as such.

A further object is to provide such a self-contained clutch sprag and spacer unit in which the spacers are of resilient material and molded to be a continuous single element extending through holes in the sprags and molded to the sprags all to hold them in assembled position and control their tilting.

A still further object is to provide in such a clutch, sprags of such improved contours that will so place their centers of gravity as to improve their capacity to become disengaged in an overrunning clutch position.

With the foregoing and other objects in view, the invention resides in the combination of parts and in the details of construction hereinafter set forth in the following specification and appended claims, certain embodiments thereof being illustrated in the accompanying drawings, in which:

Referring more particularly to the drawings, the clutch may be designed to connect an inner race 1 and an outer race 2 having spaced coaxial cylindrical surfaces. The inner race may be formed on its interior with one or more splines 3 for connection to a shaft and the outer race may be formed on its exterior for mounting in any suitable element to be connected to the shaft.

Figure 1:
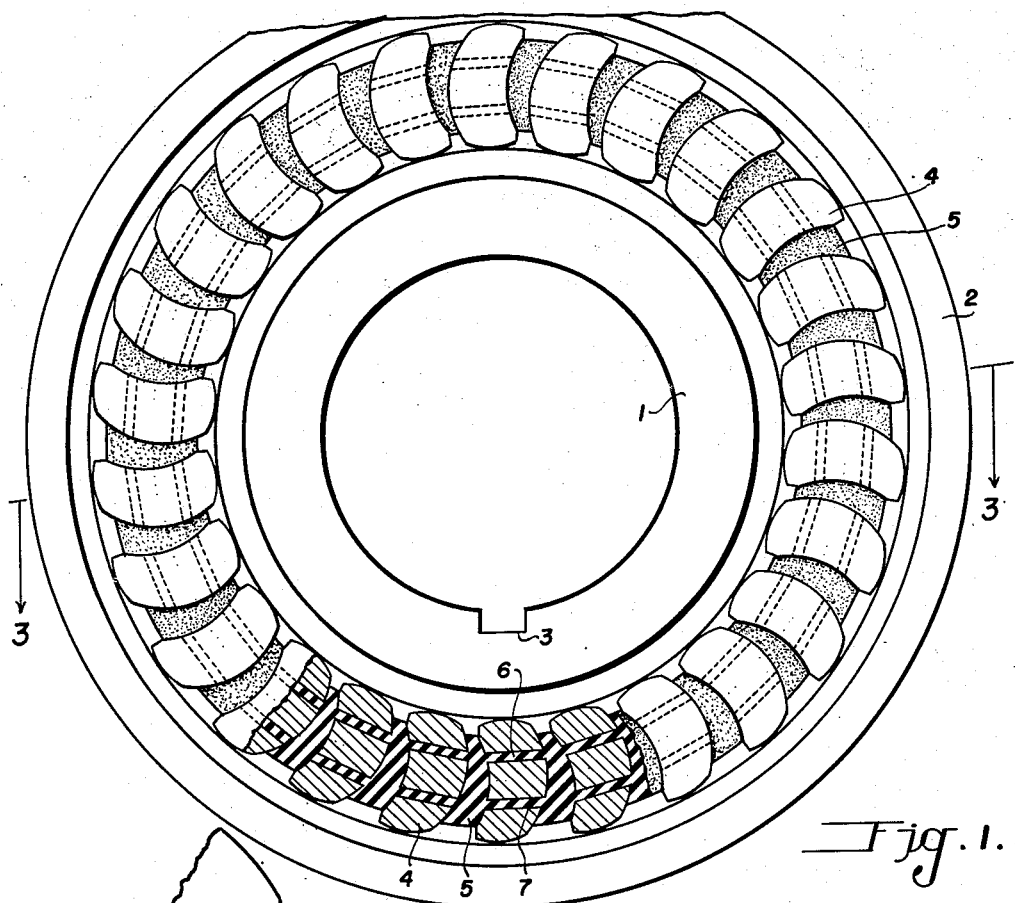
Figure 1 is a view in end elevation, partly in section showing a preferred form of the clutch embodying the invention.

The clutch, which is adapted to connect the inner and outer races, includes a series of tiltable gripping metallic sprags 4 that are held spaced apart by a series of alternately arranged rubber-like flexible resilient compressible non-metallic spacers 5 with which the sprags are molded. Departing from the usual construction or employing separate spacer elements and employing spring or other tying elements to hold the assembled sprags and spacers together, the present invention contemplates the forming of parallel holes in each of the sprags and the molding of rubber, or compound containing rubber, into the form of spacers. In the molding operation the rubber spacers are molded together with the sprags. Moreover, the rubber extends through the holes in the sprags in the form of tying elements as shown at 6 and 7 so that the molded rubber element is integral to include the series of spacers 5 as well as the connecting rubber tying links 6 and 7. In this manner the clutch is a virtually integral self-contained unit throughout its entire length and a unit which may be handled as such. As shown in Figure 1, the greatest diameter of each sprag is greater than the space between the races 1 and 2 and the greatest diameter of each spacer is appreciably less than this space to permit tilting of the sprags in contact with the two spaced races.

Figure 2:
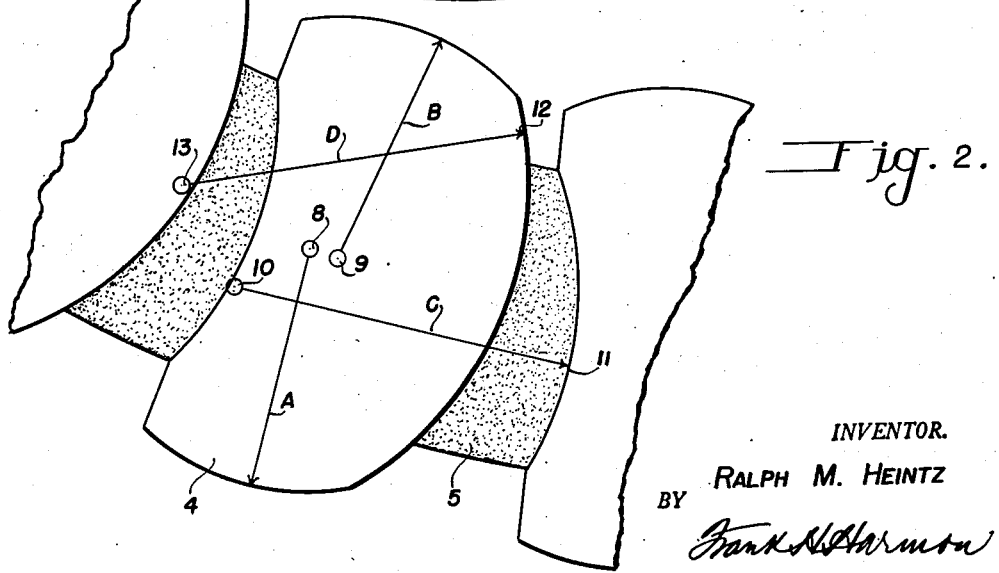
Figure 2 is a similar end view enlarged of one sprag with its spacers between adjacent sprags.

Figure 2 illustrates the contour of one sprag and the relationship between its contour and that of its two adjacent sprags which are separated by spacers. The line of action to engage the clutch involves the tilting of the sprag about a fulcrum point 8 in a counterclockwise direction and the line of action to disengage the clutch involves the shifting of the sprag fulcrum point 8 to fulcrum point 9 and the tilting of the sprag about point 9 in a clockwise direction. The radius from the fulcrum point 8 to the outer circumference of the sprag and indicated by line A is equal to line B indicating the radius from fulcrum point 9. Also the line C from point 10 of the middle sprag of Figure 2 to point 11 of the sprag on the right is the same length as that of line D from point 12 of the middle sprag to point 13 on the sprag to the left. This is an illustration of a preferred contour of each sprag and its relationship to the adjacent sprags determined by the normal contour of the intervening rubber spacers which space, and by means of the integral rubber tying portions 6 and 7 hold, the sprags flexibly in place in the assembly. This places and determines the two points 8 and 9 of fulcrum for the sprags as they tilt into and out of clutching engagement with the inner and outer races. The sprags all operate in unison so that the races will be gripped together uniformly throughout their circumferences.

Moreover, in addition to the molding of the spacers with the sprags, the rubber molding, being in one integral piece to include all the spacers and tying elements materially enhances uniformity of action of the sprags far and above the conventional separate rigid spacers tied together by a continuous wire spring or other tying devices.

Figure 3:
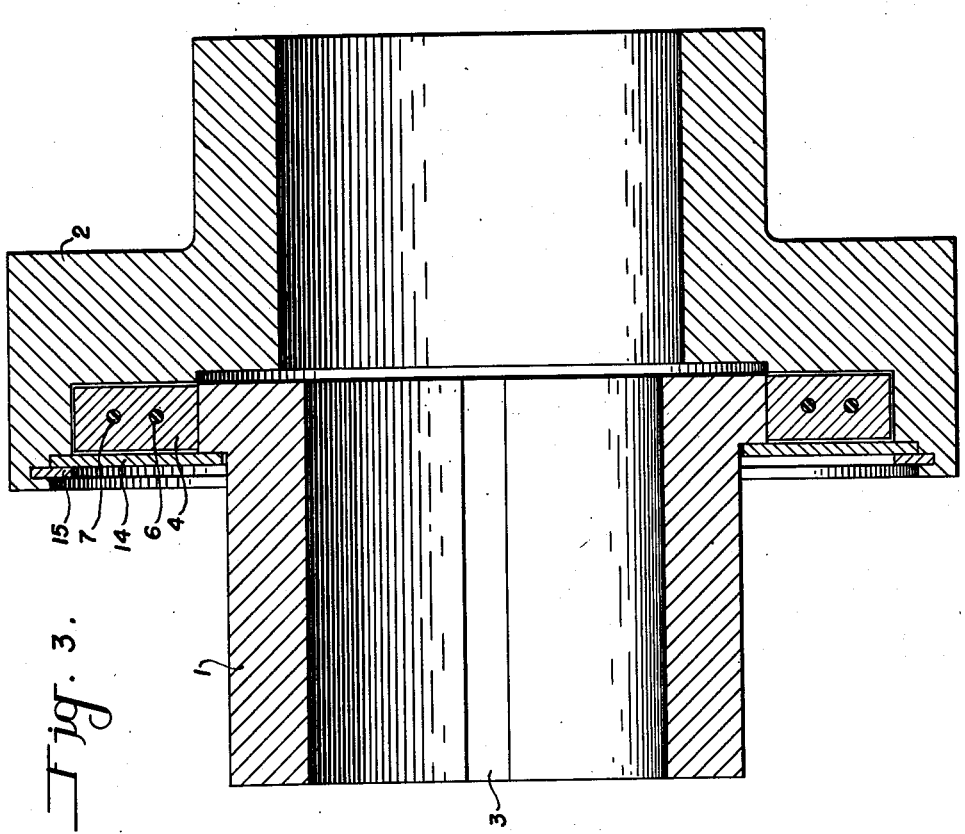
Figure 3 is a view in section taken along line 3—3 of Figure 1.

Figure 3 shows the assembly including the inner race and outer race in spaced relationship and the sprags 4, with the rubber molded tying elements 6 and 7, and the retainer 14 and snap ring 15 for holding the clutch with its sprags and spacers in place.

I claim:

A unitary self-contained overrunning clutch for effecting a drive between radially spaced inner and outer rotative elements and comprising a plurality of rotatably tiltable radially elongated sprags of rigid material, a plurality of spacers of non-metallic, elastic, resilient, volumetrically compressible material arranged alternately between said sprags, each of said sprags being made of rigid metallic material, each of said sprags having a hole extending transversely therethrough, relatively thin tying elements of the same elastic material as said spacers of appreciably lesser dimensions than those of said spacers extending through the hole of each sprag and molded together with each sprag to be integral with the spacers on both sides of each sprag to hold said sprags together both in tension and compression, the radial length of each tiltable sprag being greater than the space between said rotative elements and the greatest diameter of each of said spacers being less than said space to maintain said spacers out of contact with said rotative elements to permit rotatable tilting of said sprags.

RALPH M. HEINTZ.

REFERENCES CITED

The following references are of record in the file of this patent:

UNITED STATES PATENTS

| Number | Name | Date |
|---|---|---|
| 1,923,283 | Stokes | Aug. 22, 1933 |
| 2,342,227 | Swenson | Feb. 22, 1944 |
| 2,386,013 | Swenson | Oct. 2, 1945 |
| 2,407,772 | Dodge | Sept. 17, 1946 |
| 2,427,120 | Blair | Sept. 9, 1947 |
| 2,520,004 | Gondek | Aug. 22, 1950 |
| 2,555,484 | Gruenberg et al. | June 5, 1951 |